Patented June 13, 1944

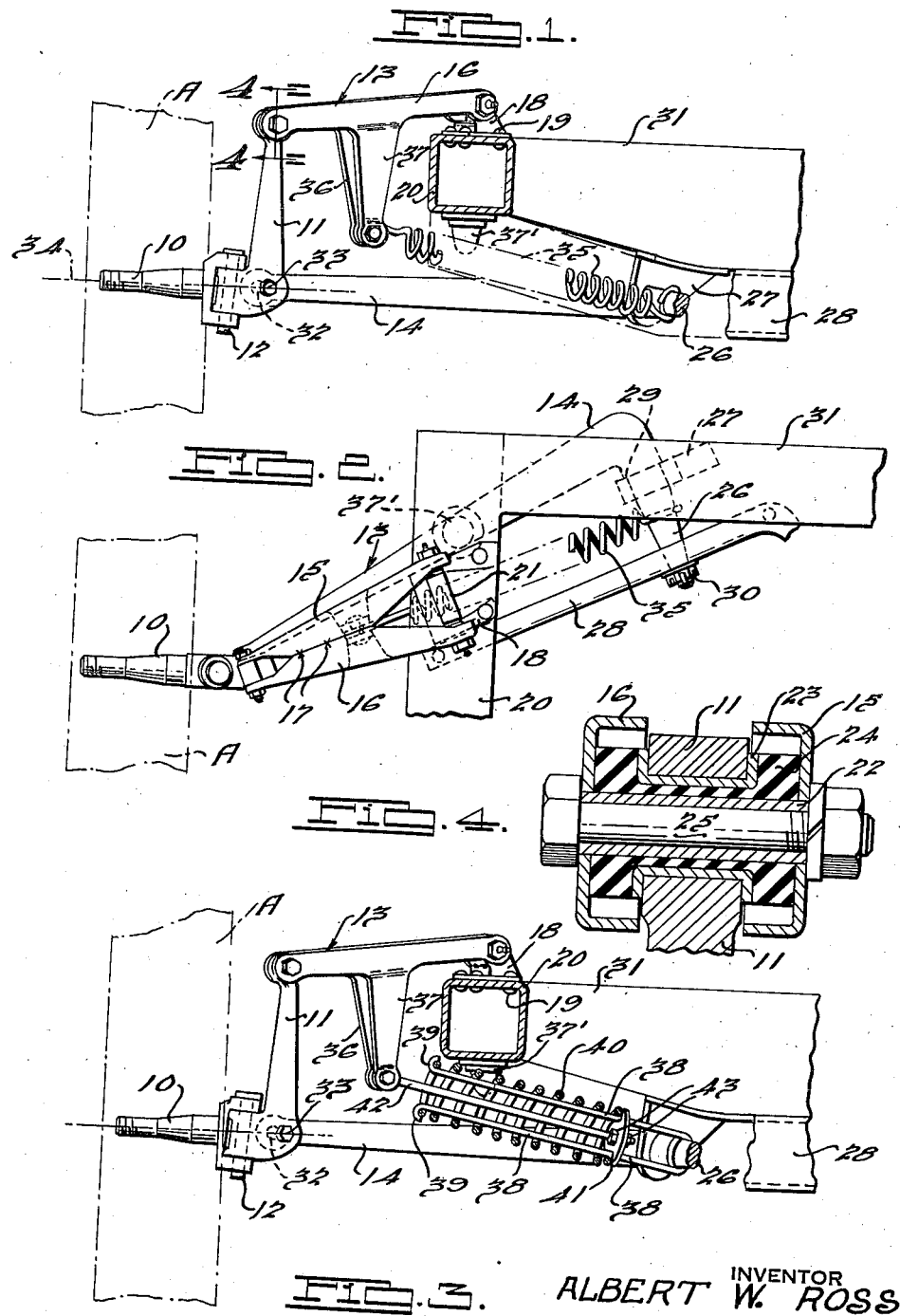

2,351,291

UNITED STATES PATENT OFFICE 2,351,291

MOTOR VEHICLE SUSPENSION

Albert W. Ross, Detroit, Mich., assignor to Chrysler Corporation, Highland Park, Mich., a corporation of Delaware Application November 16, 1940, Serial No. 365,994

8 Claims. (Cl. 267—20)

This invention relates to motor vehicles and refers more particularly to improvements in suspensions for ground wheels of motor vehicles.

An object of the invention is to provide simplified and improved means for supporting the vehicle ground wheels whereby the riding qualities of the vehicle are improved.

The invention is especially adapted for use in connection with suspension systems wherein the ground wheels are independently sprung. In such systems the riding qualities of the vehicle have been improved in that independently rising and falling movements of the wheels have reduced harshness. However, such systems have, in general, been characterized by a degree of rigidity to fore and aft displacement of the suspended wheel which has resulted in harshness in the riding qualities.

An object of the invention is to provide a suspension of the independently sprung wheel type wherein the harshness of the ride resulting from rigidity of the suspension to fore and aft wheel displacement is effectively minimized.

Suspension systems of the independently sprung wheel type now commonly used in motor vehicles include a wheel carrying structure having a wheel spindle and an upright arm, this structure being swingingly connected to the vehicle frame by a pair of vertically spaced control arms. In practice the lower arm has been of the type which constitutes a rigid truss with the result that fore and aft displacement of the associated road wheel is rigidly resisted. In embodying the invention in this type of suspension the rigidity is eliminated by supporting and guiding the wheel carrying structure through a control arm, preferably the lower thereof, which resists fore and aft loading directly and which will deflect under fore and aft load, thereby relieving harshness. This control arm has a pivotal connection with the upright arm of the wheel carrying means and this connection is preferably disposed in a horizontal plane containing the axis of the wheel spindle such that this arm constitutes the main influence on the degree of the harshness of the ride resulting from fore and aft displacement of the suspended ground wheel, and by reason of this arm deflecting under fore and aft load, the riding qualities have been improved.

Another object of the invention is to provide a suspension of the independently sprung wheel type wherein the vehicle frame may be simplified, with resulting improved strength and rigidity, with respect to the vehicle. The invention makes possible elimination of the vertically disposed coil spring of these systems, and the lateral extension of the frame to accommodate the same and results in providing suitable clearance for the parts and rendering them more accessible.

Other objects of the invention will be more apparent from the following description taken in connection with the accompanying drawing, wherein:

Fig. 1 is an elevational view, partly in section, of a typical ground wheel suspension embodying the invention.

Fig. 2 is a top plan view of the structure shown in Fig. 1.

Fig. 3 is a view similar to Fig. 1, but showing a modified form of spring.

Fig. 4 is a sectional view taken on the line 4—4 of Fig. 1.

In the drawing the invention is illustrated in connection with a steerable ground wheel A, it being understood that the laterally opposite wheel is similarly suspended. In the suspension in which the invention is illustrated there is provided a wheel carrying structure including the spindle 10 which is swivelly connected to an upright knuckle support arm 11 by a king pin 12 to accommodate steering movement of the wheel A.

The wheel carrying structure is connected to the vehicle frame by upper and lower arms 13 and 14, respectively. The upper arm comprises a pair of sheet metal stampings 15 and 16, preferably stampings channel-shaped in cross section, which open one toward the other and are welded together as at 17. A support 18 is secured by rivets or the like 19 to the adjacent longitudinally extending side rail 20 of the vehicle frame. The inner end of the members 15 and 16 are laterally spaced and are swingingly connected to a shaft 21 secured to the support 18.

The outer end of the arm 13 has an articulated connection with the upper end portion of the knuckle support arm 11, the members 15 and 16 having openings aligned with an opening in the upper end portion of the support arm 11. A bushing 22 extends through these aligned openings and a second bushing 23, generally spool-like, is interposed between the wall bounding the opening in the arm 11 and the bushing 22. A spool-like bushing 24 of rubber-like material has the axially extending portion thereof disposed between the bushings 22 and 23 and the lateral flanges thereof extended between the adjacent arm members and the lateral flanges of the bushing 23. The bushings 23 and 24 may be made in sections to facilitate assembly and the material of the bushing 24 may be bonded thereto if desired. A connector pin 25 extends through the bushing 22 retaining the parts in assembled relation.

The lower arm 14, which may be a stamped or forged member, has a relatively short angularly disposed portion 26 swingingly supported from the vehicle frame by a bracket 27, secured to the latter and providing a suitable journal for the portion 26, the free end portion of the latter extending through the web of a channel frame member 28. The portion 26 has a shoulder 29 abutting the adjacent face of the bracket 27 and which is drawn thereagainst by a nut member 30 threaded onto the end of the portion 26 extending through the frame member 28. The latter extends angularly between the side rail 20 and the frame cross member 31.

The outer end of the arm 14 has an articulated connection at 32 with the lower end portion of the support arm 11, the latter having an opening through which extends a cantilever-like end portion of the arm 14, with a securing nut 33 threaded thereon. The connection 32 and the pivotal axis of the lower arm angular portion 26 are disposed in a horizontal plane containing the axis of the wheel spindle 10, as indicated by the line 34. A coil spring 35 secured to the portion 26 of the lower arm 14 and to the depending flanges 36 and 37 of the members 15 and 16, respectively, yieldably opposes relative displacement of the frame and wheel-carrying structure, this spring acting in tension. A buffer 37' secured to the frame side rail 20 is engageable with the arm 14 to yieldably limit relative vertical displacement of the aforesaid structure.

The form of invention illustrated in Fig. 3 embodies the parts shown in Figs. 1 and 2, with the exception of the spring 35, and these parts have been similarly identified. The spring and the connection therefor include a pair of parallel reversely bent rods 38 having the connected end seated in a groove in the lower arm portion 26, the free ends of the rods 38 being reversely bent as at 39 to form a spring abutment. The rods 38 constitute a carrying and guiding means for a coil spring 40 acting adjacent the abutment 39. A disc 41 abuts the opposite end of the spring 40 and is provided with a pair of peripheral indentations receiving the rods 38 respectively and has a central opening through which extends a spring actuating rod 42, the disc 41 being retained between the adjusting and securing nuts 43 threaded onto the rod 42. The opposite end of the latter is connected with the flanges 36 and 37 of the upper arm 13. The spring 40 acts in compression in resisting relative displacement of the wheel carrying structure and vehicle frame.

In operation of the arrangement illustrated and described, the wheel carrying structure is guided in its rising and falling movements and the control arm 14 has its extremities connected to this structure, as well as to the vehicle frame, in a horizontal plane containing the axis of the wheel carrying spindle such that this arm will deflect and springingly accommodate limited fore and aft deflection of the wheel carrying structure. The arm 14 resists fore and aft load or deflection directly and in bending or springing under this load reduces hardness which would otherwise result should a rigid truss structure constitute the arm 14. While the support arm 11 may be subjected to relatively small degrees of deflection due to fore and aft load, such deflection is accommodated by the connection of this arm with the arm 13 and the latter has no appreciable deflection. However, this latter connection may be of the threaded type as is quite commonly employed in independently sprung wheel systems.

The relative disposition of the parts is such that the lower arm constitutes the main resistance to fore and aft deflection of the wheel and thus its relative rigidity influences the quality of the ride and the characteristic of springing under load makes for smooth vehicle riding qualities.

The arrangements eliminate the necessity for offsets in the frame cross member and can be of straight box section if desired. In addition there is a perceptible improvement due to the simplification of the structures at this portion of the vehicle and rendering the parts more accessible for service.

I claim:

1. In a suspension for a motor vehicle ground wheel, a wheel carrying structure including a spindle and an upright arm; supporting and guiding means for said structure including an upper arm pivotally connected to the upper end portion of said upright arm and the vehicle frame and having means depending therefrom disposed between the upright arm and the vehicle frame, a lower arm pivotally connected to the lower end portion of said upright arm and the vehicle frame, the connection between said lower arm and said upright arm lying approximately in a horizontal plane containing the axis of said spindle, and a coil spring secured to said depending means and said lower arm and extending generally transversely of the vehicle.

2. In a suspension for a motor vehicle ground wheel, a wheel carrying structure including a spindle and an upright arm; supporting and guiding means for said structure including an upper arm pivotally connected to the upper end portion of said upright arm and the vehicle frame and having means depending therefrom disposed between the upright arm and the vehicle frame, a lower arm pivotally connected to the lower end portion of said upright arm and having a relatively short portion disposed angularly with respect to the main portion thereof swingingly connected to the vehicle frame, and a coil spring connected to said depending means and to said relatively short portion of the lower arm.

3. In a suspension for a motor vehicle ground wheel, a wheel carrying structure including a spindle and an upright arm; supporting and guiding means for said structure including an upper arm pivotally connected to the upper end portion of said upright arm and the vehicle frame and having means depending therefrom disposed between the upright arm and the vehicle frame, a lower arm pivotally connected to the lower end portion of said upright arm and having a relatively short portion disposed angularly with respect to the main portion thereof swingingly connected to the vehicle frame, and a coil spring connected to said depending means and to said relatively short portion of the lower arm, the connection between said lower arm and said upright arm lying approximately in a horizontal plane containing the axis of said spindle.

4. In a suspension for a motor vehicle ground wheel, a wheel carrying structure including a wheel spindle and an upright arm; supporting and guiding means for said structure including an upper arm structure pivotally connected to the upper end portion of said upright arm and to the vehicle frame and having means depending therefrom disposed between said upright arm and the vehicle frame, a rod member pivotally connected to the lower end portion of said upright arm having an angular portion pivotally connected to the vehicle frame, the connections of said rod member with the support arm and frame being disposed approximately in a horizontal plane containing the axis of said spindle; and a spring connected to said depending means and said angular portion of the rod member opposing relative displacement of said wheel-carrying structure.

5. In a suspension for a motor vehicle ground wheel, a wheel-carrying structure including a wheel spindle and an upright arm; supporting and guiding means for said structure including an upper arm pivotally connected with the upper end portion of said upright arm and to the vehicle frame, a rod member constituting a lower support arm for said structure swingingly connected to the vehicle frame and pivotally connected to the lower end portion of said upright arm, the last mentioned pivotal connection being disposed approximately in a horizontal plane containing the axis of said spindle and means yieldably opposing relative displacement of said wheel-carrying structure including spring guiding structure having an abutment carried thereby and secured to said rod member, a coil spring carried by said guiding means acting against said abutment, and a spring actuator secured to said upper arm and said spring.

6. In a suspension for a motor vehicle ground wheel, a wheel carrying structure including a spindle and an upright arm; supporting and guiding means for said structure including an upper arm pivotally connected to the upper end portion of said upright arm and the vehicle frame and having means depending therefrom disposed between the upright arm and the vehicle frame, a single lower arm flexible to accommodate horizontal deflection of said wheel carrying structure pivotally connected to the lower end portion of said upright arm and the vehicle frame, the connection between said lower arm and said upright arm lying approximately in a horizontal plane containing the axis of said spindle, and a coil spring extending generally transversely of the vehicle having one end secured to said depending means and the other end anchored with respect to the vehicle frame and operable to resist vertical displacement of the wheel carrying structure.

7. In a suspension for a motor vehicle ground wheel, a wheel-carrying structure including a generally upright member and a wheel spindle, supporting and guiding means for said structure including a relatively rigid arm having articulated connections respectively with the upper end portion of said member and the vehicle frame structure, at least one of said connections accommodating limited deflection of said wheel-carrying structure fore and aft with respect to the vehicle, and a single arm inherently flexible to accommodate deflection of said wheel-carrying structure fore and aft with respect to the vehicle having articulated connections respectively with the lower end portion of said member and the vehicle frame structure, the connection between said flexible arm and member being disposed approximately in a horizontal plane containing the axis of said spindle.

8. In a suspension for a motor vehicle ground wheel, a wheel-carrying structure including a generally upright member and a wheel spindle, supporting and guiding means for said structure including a relatively rigid arm having articulated connections respectively with the upper end portion of said member and the vehicle frame structure, at least one of said connections accommodating limited deflection of said wheel-carrying structure fore and aft with respect to the vehicle, a single arm inherently flexible to accommodate deflection of said wheel-carrying structure fore and aft with respect to the vehicle having articulated connections respectively with the lower end portion of said member and the vehicle frame structure, the connection between said flexible arm and member being disposed approximately in a horizontal plane containing the axis of said spindle, and a spring extending generally transversely of the vehicle having one end thereof connected with said relatively rigid arm and the other end thereof anchored with respect to the vehicle frame structure.

ALBERT W. ROSS.